United States Patent [19]

Seyferth et al.

[11] Patent Number: 4,820,783
[45] Date of Patent: Apr. 11, 1989

[54] METHOD FOR FORMING NEW PRECERAMIC POLYMERS FOR SIC AND SI₃N4/SIC

[75] Inventors: Dietmar Seyferth, Lexington, Mass.; Timothy G. Wood, North Wales, Pa.; Yuan-Fu Yu, Cambridge, Mass.

[73] Assignee: Massachusetts Institute of Technology, Cambridge, Mass.

[21] Appl. No.: 915,134

[22] Filed: Oct. 3, 1986

Related U.S. Application Data

[62] Division of Ser. No. 756,353, Jul. 18, 1985, Pat. No. 4,645,807.

[51] Int. Cl.⁴ .................................. C08F 283/00
[52] U.S. Cl. ............................ 525/474; 501/88; 501/92; 501/97; 525/475; 525/478; 528/25; 528/26; 528/31; 528/32; 528/33; 528/37; 528/28
[58] Field of Search ............... 525/474, 475, 478; 528/25, 26, 31, 32, 33, 37, 28; 501/92, 88, 97

[56] References Cited

U.S. PATENT DOCUMENTS

| | | | |
|---|---|---|---|
| 3,108,985 | 10/1963 | Wever | 260/37 |
| 3,853,567 | 12/1974 | Verbeek | 106/44 |
| 3,892,583 | 7/1975 | Winter et al. | 106/55 |
| 4,310,651 | 1/1982 | Baney et al. | 528/23 |
| 4,312,970 | 1/1982 | Gaul, Jr. | 528/32 |
| 4,482,669 | 11/1984 | Seyferth et al. | 528/28 |
| 4,482,689 | 11/1984 | Haluska | 528/25 |
| 4,535,007 | 8/1985 | Cannady | 525/474 |
| 4,537,942 | 8/1985 | Brown-Wensley et al. | 528/25 |
| 4,611,035 | 9/1986 | Brown-Wensley et al. | 525/474 |
| 4,639,501 | 1/1987 | Seyferth et al. | 528/15 |
| 4,645,807 | 2/1987 | Seyferth et al. | 528/25 |
| 4,650,837 | 3/1987 | Seyferth et al. | 525/478 |
| 4,656,300 | 4/1987 | Lebrun et al. | 528/28 |

OTHER PUBLICATIONS

C. L. Shilling, Jr. and T. C. Williams, Technical Report ONR Contract N00014-81-C-0682 (1983).
R. W. Rice, Amer. Ceram. Soc. Bull, 62:889–892 (1983).
Aitken, C. et al., J. Organomet Chem. 279:011–013 (1985).
S. Yajima, Amer. Ceram. Soc. Bull., 62:893–898; 903 (1983).
Kruger, C. R. and Rochow, E. G., J. Polymer Sci:Part A 2:3179–3189 (1964).
Monatshefte fur Chemie, 95:750–765 (1964).
J. Organomet, Chem. 3:129 (1965).
Izv. Akad. Nauk SSR, Otd. Khim. Nauk 290:1313 (1962).
Andrianov, K. A. et al., Dokl. Akad. Nauk SSSR, 145:1049 (1962).
Plasticheskie Massy, 11:16 (1963).
Redl, G. and Rochow, E. G., Angewandte Chemie, 76:650 (1964).
Penn et al., J. Appl. Polymer Sci., 27:3751–61 (1982).

Primary Examiner—Melvyn I. Marquis
Attorney, Agent, or Firm—George W. Neuner; Ronald I. Eisenstein

[57] ABSTRACT

A method of forming preceramic polymers using a organopolysilane of the formula $[(RSiH)_x(RSi)_y]_n$, where R is a lower alkyl group having from 1 to about 6 carbon atoms, a lower alkenyl group having from 2 to about 6 carbon atoms, a substituted or unsubstituted lower aryl group having from 6 to about 10 carbons atoms, a tri(lower)alkyl- or di(lower)alkylsilyl group and n is an integer greater than 1, and reacting it with alkali metal amides or silylamides in catalytic quantities is disclosed. Preferably, the alkali metal amide is a polymeric alkali metal silylamide of the formula $[(R^1SiHNH)_a(R^1SiN)_b(R^1SiHNM)_c]_m$ where $a+b+c=I$; $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and n and m are integers greater than I. Novel preceramic polymers formed by this method are also disclosed.

18 Claims, 3 Drawing Sheets

METHOD FOR FORMING NEW PRECERAMIC POLYMERS FOR SIC AND SI₃N₄/SIC

The Government has rights in this invention pursuant to Contract Number AFOSR-83-0003 awarded by the Department of the Air Force.

This is a division of co-pending application Ser. No. 756,353, filed on July 18, 1985, now U.S. Pat. No. 4,645,807.

The present invention relates to a process for preparing organosilicon preceramic polymers useful for making silicon carbide, SiC, and silicon nitride/silicon carbide, $Si_3N_4$/SiC, ceramics and for their pyrolysis to ceramic materials.

There is a great deal of interest in preceramic polymer materials, which can be pyrolyzed to yield SiC, $Si_3N_4$ and other silicon-based ceramic materials. R. W. Rice, *Amer. Ceram. Soc. Bull.*, 62: 889-892 (1983). Applications for such polymers include, among others:

1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers, or as a binder for ceramic powders (with subsequent pyrolysis to form a ceramic body);
4. oxidation-resistant coatings on otherwise oxidizable materials (such as carbon/carbon composites)—after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc., of the body; and
6. formation of thin films of the ceramic material for electronics applications.

For instance, Penn et al., *J. Appl. Polymer Sci.*, 27: 3751-61 (1982) describe the preparation of silicon carbide-silicon nitride fibers from a polycarbosilazane precursor. Tris(N-methylamino)methylsilane monomer was formed by reaction of monomethylamine and methyltrichlorosilane in dry petroleum ether and a polycarbosilazane resin was formed by passing the monomer over glass Raschig rings at 520° C. The brittle polymer was soluble in methylene chloride and chloroform, etc. This product was spun into fibers, crosslinked in air and then pyrolyzed to give ceramic fibers.

Other polymer precursors for forming silicon carbide and silicon nitride ceramics have been described in U.S. Pat. Nos. 3,108,985; 3,853,567; 3,892,583; 4,310,651 and 4,312,970. These linear or crosslinked polymers and processes for producing ceramic materials have generally been found to be deficient in one or more ways.

Another method uses $(CH_3)_2SiCl_2$ as a starting material. S. Yajima, *Amer. Ceram. Soc. Bull.*, 62: 893-898; 903 (1983). Although this method has been used commercially, the 2C:1Si stoichiometry of the starting material results in excess carbon being left after reaction.

Methylsilicon compounds with a 1C:1Si stoichiometry are known. These include $CH_3SiCl_3$ and $CH_3SiHCl_2$. The former, however, yields highly crosslinked insoluble products on treatment with an alkali metal in a compatible diluent making its use unsuitable. $CH_3SiHCl_2$, in theory, should give $[CH_3SiH]_n$ cyclic oligomers and linear polymers on reaction with an alkali metal. A process has been discussed where $CH_3SiHCl_2$ comprises about 30% of a mixed organochlorosilane reaction mixture which is thereafter treated with metallic potassium. See C. L. Shilling, Jr. and T. C. Williams, *Technical Report*, ONR Contract N00014-81-C-0682 (1983); *Gov. Rep. Announce. Index* (U.S.), 84 (18):48 (1984). The 30% $CH_3SiHCl_2$ contribution yielded a final product, $[(CH_3SiH)_{0.2}(CH_3Si)_{0.8}]$, which indicates that some SiH bonds had reacted with potassium.

It would be useful to have a polymer precursor that is formed from readily available and relatively cheap starting materials, that is stable at room temperature, is soluble in organic solvents and whose pyrolysis can provide a high yield of ceramics which contain SiC or SiC and $Si_3N_4$, but substantially no free carbon or silicon.

SUMMARY OF INVENTION

It has now been found that reacting a polysilane compound of the formula $[(RSiH)_x(RSi)_y]_n$, (where $x+y=1$, n is an integer greater than 1, R is a lower alkyl group having from 1 to about 6 carbon atoms, a lower alkenyl group having from 2 to about 6 carbon atoms, a substituted or unsubstituted lower aryl group having from 6 to about 10 carbon atoms, or a tri(lower)alkyl- or di(lower)alkylsilyl group) with an alkali metal amide in catalytic quantities converts these polysilane compounds into materials of higher molecular weight whose pyrolysis provides high ceramic yields. Preferably, the alkali metal amide is a polymeric alkali metal silylamide of the formula $[(R^1SiHNH)_a(R^1SiN)_b(R^1SiHNM)_c]_m$ (where $a+b+c=1$; $R^1$ is a lower alkyl group having from 1 to about 6 carbon atoms, a substituted or unsubstituted lower alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group; M is an alkali metal or one-half equivalent of an alkaline earth metal; and m is an integer greater than (1). This alkali metal silylamide may be preformed and added subsequently to the polysilane $[(RSiH)_x(RSi)_y]_n$. Alternatively, one may prepare the alkali metal silylamide in situ, in the presence of the polysilane $[(RSiH)_x(RSi)_y]_n$. Polysilanes containing some RR'Si units may be used as well, i.e., $[(RSiH)_a(RSi)_b(RR'Si)_c]_m$ where R', m, a, b, and c are the same as defined above, R' is defined as in R, and R' may be the same or different than R. A preferred composition is where $R=R'=CH_3$.

The special case where x in $[(RSiH)_x(RSi)_y]_n$ is equal to 1 is included within the scope of this invention. Polymers of the type $(RSiH)_n$ (e.g., $(PhSiH)_n$ (where Ph is phenyl), react in the same way as the above described-organopolysilanes to give new organopolysilane/organopolysilazane hybrid polymers.

In one embodiment of the present invention, the polymeric alkali metal silylamide is generated by treating the ammonolysis product of $R^1SiHX_2$ ($R^1$ is as defined above and X is a halogen) with a basic catalyst capable of deprotonating the hydrogen from a nitrogen atom adjacent to a silicon atom in the presence of $[(RSiH)_x(RSi)_y]_n$. The silylamide thus formed can react with the $[RSiH)_x(RSi)_y]_n$ already present. With either the preformed polysilylamide or the in situ silylamide procedure, the reaction mixture containing the polysilane and the polysilylamide is stirred at room temperature and preferably heated at reflux to complete the reaction. The resulting solution is then cooled and quenched with an organic halide or a silicon halide to produce the organosilicon polymers of the present invention. The polymers formed by either method can then by pyrolyzed to yield ceramic materials in high yield.

DETAILED DESCRIPTION OF THE INVENTION

Figure 1:
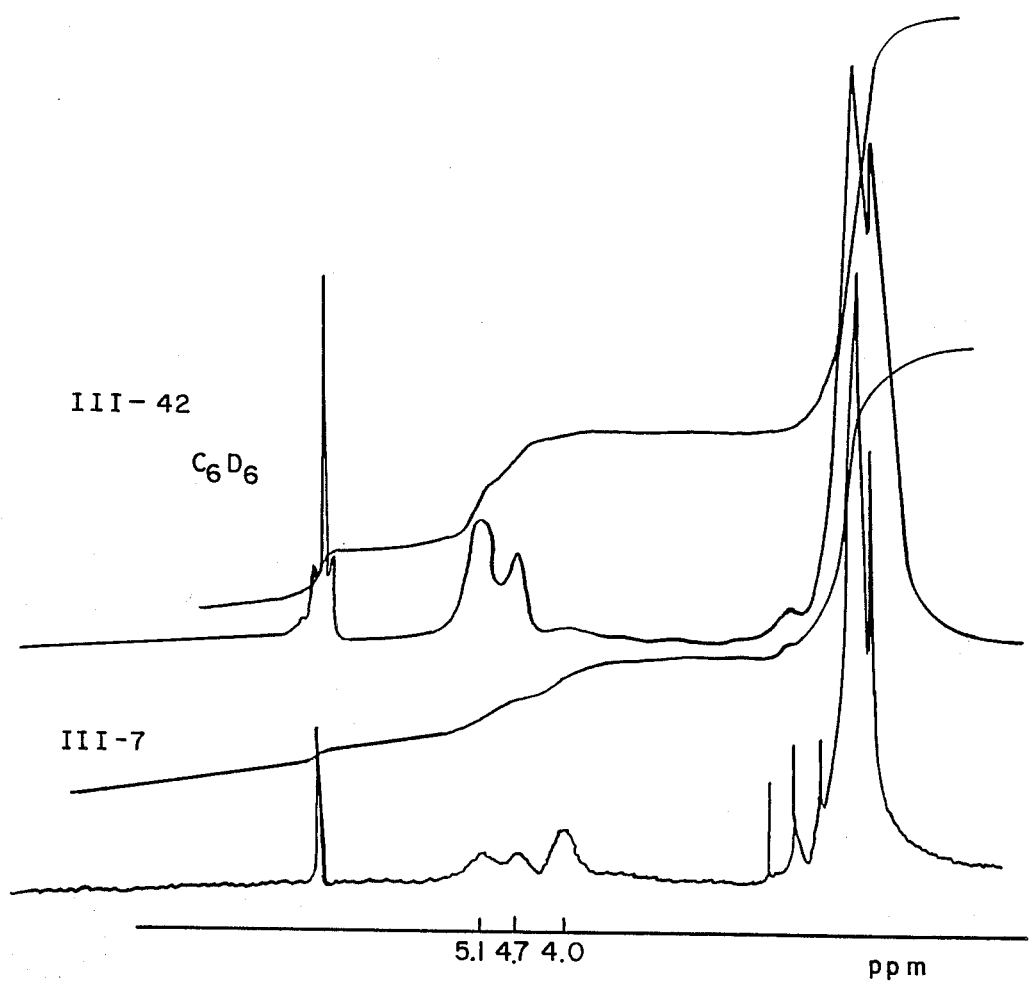
FIG. 1 is a proton NMR spectrum comparing a polymer formed by adding already preformed polysilylamide (III-7) with a polymer formed with polysilylamide generated in situ (III-42).

The invention will be further described by using an organopolysilane when R is $CH_3$ for convenience. However, it will be appreciated by those skilled in the art that the same reactions and considerations can be applied for other R groups.

The reaction of $CH_3SiHCl_2$ with an alkali metal will produce methylsilicon compounds of the formula $[(CH_3SiH)_x(CH_3Si)_y]_n$, where $x+y=1$; and n is an integer greater than 1 (hereinafter such compounds will be referred to as "methylpolysilanes"). The ceramic product obtained when this compound is pyrolyzed contains an excess of "free" silicon, rather than the ideal 1Si:1C composition. Further, depending upon the particular process used to obtain the methylpolysilane, other deficiencies can arise. A ceramic yield of less than 50% after pyrolysis typically represents an unacceptable preceramic polymer. Of the above described methylpolysilanes, those with $x \cong y$ which on pyrolysis gave a reasonable ceramic yield, had only a limited solubility in organic solvents, thus limiting further processing. Additionally, conversion of these polymers to ceramic fibers appears to require a photolysis-oxidation cure step. A methylpolysilane of the above-described formula, in which the crosslinking of the product is not as excessive ($x>y$) and, which is, therefore, more soluble in organic solvents, on the other hand provides an unacceptably low ceramic yield on pyrolysis, e.g., 12-27% in various runs. Consequently, alkali metal condensation of $CH_3SiHCl_2$ does not give a very useful preceramic polymer which can be used to form SiC and other Si/C ceramic materials.

After extensive research we have now found that organopolysilanes such as the methylpolysilanes obtained in the above reactions, upon treatment with catalytic quantities of alkali metal amides in accord with the present invention, yield preceramic polymers of higher molecular weight which upon pyrolysis give significantly higher ceramic yields. Such polymers, when prepared as described herein, are soluble in organic solvents.

In accord with the present invention, treatment of polysilanes with an alkali metal amide will provide higher molecular weight preceramic materials and improve the ceramic yield. Preferably, one uses organic alkali metal amides for treating the organopolysilane. Organic alkali metal amides are well known to the person of ordinary skill in the art. Examples include: potassium piperidide,

potassium ethylamide, $C_2H_5NHK$, and potassium diisopropylamide, $(i-C_3H_7)_2NK$, corresponding lithium, sodium, rubidium and cesium derivatives and the like. Polymeric secondary amines may be partially deprotonated by a strong base to give polymers containing metal amide functions. Such products also may be used to react with $[(CH_3SiH)_x(CH_3Si)_y]_n$ in this invention. Examples of such polymeric amines are: poly(ethyleneimine), $[CH_2CH_2NH]_n$, or Ciba-Geigy Chimassorb®944 polymer,

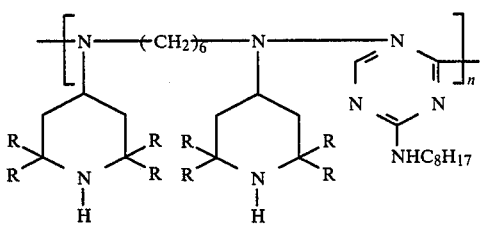

The resulting products obtained when these organic alkali metal amides were used were white solids with a higher molecular weight than the starting material. The ceramic yields obtained on pyrolysis to 1000° C. typically are 50 to 60%, or more.

More preferably, one utilizes an alkali metal silylamide. The alkali metal silylamide can be $[R^2R^3R^4Si]_2NM$ wherein $R^2$, $R^3$ and $R^4$ are each a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group, $R^2$, $R^3$ and $R^4$ may be the same or different; and M is an alkali metal or one-half equivalent of an alkaline earth metal. Common alkali metal silylamides include: $[(CH_3)_3Si]_2NK$, $[(CH_3)_2(CH_2=CH)Si]_2NK$. The alkali metal silylamide can also be partially deprotonated cyclo-$[R^5R^6SiNH]_m$ containing cyclo-$[R^5R^6SiNM]$ units wherein $R^5$ and $R^6$ are each a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group, $R^5$ and $R^6$ may be the same or different; M is as defined above and m is an integer greater than 1. For example, the reaction products of one molar equilvalent of KH with one of cyclo-$[(CH_3)_2SiNH]_3$ and of one molar equivalent of KH with one of cyclo-$[(CH_3)(CH_2=CH)SiNH]_3$, and the like. The person skilled in the art can select other alkali metal silylamides to use, including lithium, sodium, rubidium and cesium derivatives. Treatment of the organopolysilane with alkali metal silylamides results in increased ceramic yield in the pyrolysis of the resulting organopolysilane. Preferably, one desires a ceramic product which contains neither an excess of free silicon nor an excess of free carbon.

When catalytic quantities of such low molecular weight silylamides are used to form ceramics, the ceramic material obtained on pyrolysis may contain substantial amounts of free silicon. Free silicon, if present, can be eliminated or alleviated, for example, in the following manner. In place of the low molecular weight silylamides one may use a polymeric silylamide of the formula $[(R^1SiHNH)_a(R^1SiN)_b(R^1SiHNM)_c]_m$, where $a+b+c=1$; $R^1$ is a lower alkyl group having from 1 to 6 carbon atoms, a substituted or unsubstituted alkenyl group having from 2 to about 6 carbon atoms, a substituted or unsubstituted lower aryl group having from 6 to about 10 carbon atoms, a tri(lower)alkylsilyl or di(lower)alkylsilyl or di(lower)alkylamino group; M is an alkali metal or one-half equivalent of an alkaline earth metal; and m is an integer greater than 1. In the practice of the present invention, $R^1$ preferably is a lower alkyl group, more preferably $CH_3$. These polysilylamide compounds have been described in U.S. Pat. No. 4,482,669, issued Nov. 13, 1984, which is incorporated herein by reference. This patent describes the formation of novel preceramic polysilazanes by treatment of the mainly cyclic ammonolysis product of, for example, $CH_3SiHCl_2$ with catalytic quantities of KH in organic solvents, for example, tetrahydrofuran, THF. After these compounds are treated with an electrophile such as methyl iodide, $CH_3I$, polymers having the general formula $[(CH_3SiHNH)_a)(CH_3Si)_b(CH_3SiHNCH_3)_c]_m$ are obtained. Prior to the addition of $CH_3I$, a reactive "living" polymer intermediate, an alkali metal silylamide of the type $[(CH_3SiHNH)_a(CH_3SiN)_b(CH_3SiHNM)_c]_m$ is obtained. This intermediate species can react with electrophiles other than $CH_3I$, e.g., with diverse chlorosilanes. Pyrolysis of such $CH_3I$-treated polysilazanes typically yields a ceramic material containing SiC, $Si_3N_4$ and "free" carbon.

We have discovered that the use of the polymeric alkali metal silylamide of the formula $[(R^1SiHNH)_a(R^1SiN)_b(R^1SiHNM)_c]_m$ not only improves the ceramic yield of the organopolysilanes, but, more significantly, when this alkali metal silylamide is reacted with organopolysilane of the formula $[(RSiH)_x(RSi)_y]_n$ (where $x+y=1$, R is a lower alkyl group having from 1 to about 6 carbon atoms, a lower alkenyl group having from 2 to about 6 carbon atoms, a substituted or unsubstituted lower aryl group having from 6 to about 10 carbon atoms, a tri(lower)alkyl- or di(lower)alkylsilyl group and n is an integer greater than (1) in the appropriate stoichiometry, the reaction product of $[(RSiH)_x(RSi)_y]_n$ and $[(R^1SiHNH)_a(R^1SiN)_b(R^1SiHNM)_c]_m$ (where m and n are integers greater than (1), after treatment with a suitable electrophile such as an organic or a silyl halide, incorporates both starting materials. When this reaction product is pyrolyzed, the excess silicon normally obtained in the pyrolysis of the organopolysilane alone and the excess carbon normally obtained in the pyrolysis of the quenched polymeric alkali metal silylamide alone combine so that there is not substantial excess of either element in the ceramic product. Consequently, one can obtain a ceramic polymer with less than about 0.1% of free silicon and less than about 0.1% of free carbon, i.e., a ceramic polymer containing substantially no free carbon and no free silicon. The exact combination of the two compounds necessary to result in the desired stoichiometry can readily be calculated by a person of ordinary skill in the art on the basis of the results of the analyses of the ceramic products obtained in the pyrolysis of the separate polymers. Mole ratios of organopolysilane:polymeric alkali metal silylamide from about 4:1 to about 1:4, and preferably from 2.5:1 to 1:2 typically provide useful results. However, other ratios can be used depending on the particular starting materials and their pyrolysis characteristics.

The organo silicon polymers thus formed by reaction of $[(RSiH)_x(RSi)_y]_n$ and $[(R^1SiHNH)_a(R^1SiN)_b(R^1SiHNM)_c]_m$, followed by treatment with an electrophile, henceforth will be referred to as "graft" polymers.

Additionally, use of the reaction product of these two compounds results in a product that is self-curing as the temperature is raised in the production of ceramic material. This again is an improvement over pyrolysis of the $[(RSiH)_x(RSi)_y]_n$ compound alone.

In this system, R is preferably a lower alkyl, more preferably, R is $CH_3$. However, R need not be the same and, as aforesaid, mixtures of compounds of the above general formula, i.e., $[(RSiH)_x(RSi)_y]_n$ and $[(R''SiH)_{x'}(R''Si)_{y'}]_{n'}$, can be used to obtain further flexiblity in tailoring the properties of the aforesaid product. Mixed polymers of the type $[(RSiH)_a(RSi)_b(RR'Si)_c]_m$ where a, b, c, m and R are as defined above, and R' is defined as is R above and R' may be the same or different than R) can be used as well. Preferably, R=R'=$CH_3$. Also included in this invention is the case of $[(RSiH)_x(RSi)_y]_n$, where $x=1$, $y=0$, with R as defined above, where $[(RSiH)]_n$ may be a linear or a mixture of cyclic species, or a hybrid of both types. For example, $[PhSiH]_n$ (Ph is a phenyl group), cf, Aitken, C. et al., *J. Organomet. Chem.*, 279:C11–C13 (1985), reacts in the same way as the above-described organopolysilanes to provide new organopolysilane/organopolysilazane hybrid polymers. These mixtures will be particularly useful in attempts to avoid excess free silicon or carbon. Mixtures of alkali metal polysilazanes, i.e., $[(R^1SiHNH)_a(R^1SiN)_b(R^1SiHNE)_c]_m$ and $[(R^1'SiHNH)_{a'}(R^1'Sin)_{b'}(R^1'SiHNE)_{c'}]_{m'}$ (where E is the moiety introduced by reaction with an electrophile, e.g., a lower alkyl group of 1 to 6 carbon atoms, preferably $CH_3$, or a silyl group), also may be used.

The preceramic product obtained by using alkali metal silylamides, even in only catalytic amounts, differs from the starting organopolysilane. This difference is confirmed by proton NMR spectra. A typical starting material when R=$CH_3$ shows an observed proton NMR integration ratio, SiCH$_3$/SiH, ranging from 3.27 through 3.74 (see Table 1). In contrast, the similar ratio for products obtained when the starting material is reacted with an alkali metal silylamide, range from 8.8 to 14.

This difference in products apparently arises because both Si-H and Si-Si bonds are reactive towards nucleophilic reagents. Although not wishing to be bound by theory, it is believed that when alkali metal silylamides are used the following processes result:

(1)

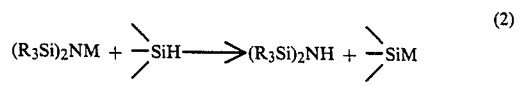

(2)

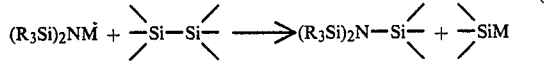

(3)

In each of the above reactions a new reactive nucleophile is generated. In the first reaction, this nucleophile is MH, while in the second and third reactions, the nucleophile is a silyl alkali metal compound. Thus, nucleophilic attack on the $[(CH_3SiH)_x(CH_3Si)_y]_n$ system will recur during these reactions and some of these oligomeric species, which comprise the starting materials, are linked together, resulting in products of higher molecular weight. There are other processes that are possible as well: e.g.,

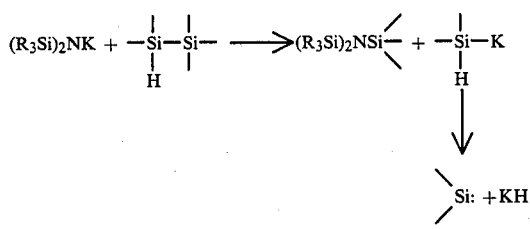

Thus, not only anionic species but also silylenes can be involved as intermediates.

The "graft" polymer is formed by combining the already formed polymeric alkali metal silylamide with the organopolysilane in varying proportions in an organic solvent. Thereafter, the mixture is stirred at room temperature for sufficient time for the two compounds to react. Any organic solvent in which both polymer systems are soluble without reaction can be used. Such organic solvents include, for example, THF, the diethyl ether, glycol ethers, alkanes, arenes and combinations thereof. The mixture can be refluxed to speed up the completion of the reaction. After refluxing, the mixture is quenched with an electrophile, E-X, to form the organosilicon "graft" polymer. The electrophile can be an alkyl halide, sulfate, or sulfonate; a halosilane; or the like. Typically, $CH_3I$ or a chlorosilane is used, although other equivalent electrophiles well-known to those skilled in the art can also be used. E is preferably a lower alkyl group or silyl group; X preferably a halide, sulfate or sulfonate. The organosilicon polymer formed by the present ("graft") process is typically obtained in yields greater than 85% based on weight of the starting materials with a variable molecular weight, typical values being in the 1800–2500 g/mol range.

This preceramic organosilicon polymer can then by pyrolyzed under inert atmosphere conditions to result in a ceramic material in high yield. Typically, pyrolysis under nitrogen gives ceramic products in a yield of 70–83%.

What is referred to herein as an "in situ" polymer is obtained by carrying out the cyclo-$(R^1SiHNH)_n$/MH reaction in solution in the presence of the organopolysilane. In this method, the methylpolysilane is added to an organic solvent. Afterwards, the cyclo-$(R^1SiHNH)_n$ mixture (generated by reacting in solution anhydrous ammonia with $R^1SiHX_2$, where $R^1$ is the same as defined earlier and X is a halogen) is added. One then adds to the solution a basic catalyst capable of deprotonating the hydrogen from a nitrogen atom adjacent to a silicon atom. See U.S. Pat. No. 4,482,669. The reaction mixture gradually changes color and hydrogen is evolved. The resulting solution is then stirred at room temperature for sufficient time for the silylamide intermediates and the organopolysilane to react. It can be heated at reflux to complete the reaction. Afterwards, the reaction mixture is allowed to cool to room temperature, if required, and quenched with an electrophile such as $CH_3I$ or a halosilane, such as a chlorosilane, to produce the organosilicon "in situ" polymer. The molecular weight of the "in situ" polymer is variable, typical values being between 1600 g/mole to 2750 g/mole. On pyrolysis this material provides a high yield of a black ceramic material.

The organosilicon polymer formed by either of the above "graft" or "in situ" methods usually is separated from solution. The solvent is removed by using techniques well known to a person of ordinary skill in the art. One standard method is distillation, preferably trap-to-trap distillation. The polymer, typically a white powder that is soluble in an organic solvent, is thereby obtained. One may also combine trap-to-trap distillation with centrifuging, followed by trap-to-trap distillation to separate the polymer from solution.

The "in situ" preceramic polymer differs physically from the "graft" preceramic polymer. Major differences are observed in their proton NMR spectra and in the form of their thermogravimetric analysis (TGA) curves.

FIG. 1 shows the proton NMR spectrum of a graft polymer and that of an "in situ" polymer. Both polymers have similar starting molar ratios of $[(CH_3SiH)_x(CH_3Si)_y]$:$(CH_3SiHNH)$, [1.5:1 and 1.45:1, respectively], in terms of initial reactants used. However, in the "in situ" polymer the intensity ratio of the δ 5.1, 4.7 to the δ 4.0 proton signals is 12, while in the "graft" polymer this ratio is 1. The signals around δ 5.1 and 4.7 are due to the $CH_3SiHN$ proton while those around δ 4.0 are due to $CH_3SiH$ protons which are attached to silicon atoms not bound to nitrogen. Accordingly, this difference in ratio demonstrates that the two polymers have different structures.

Although not wishing to be bound by theory, it appears likely that in the "in situ" preparation, intermediates formed, for example, by the action of KH on $(CH_3SiHNH)_n$ cycles also react with the $[(CH_3SiH)_x(CH_3Si)_y]_n$ before the polymeric alkali metal silylamide which is the starting reactant in the "graft" procedure has a chance to be formed to its usual extent. This results in either less of the original $CH_3SiHNH$ protons being lost and/or more of the $[(CH_3SiH)_x(CH_3Si)_y]_n$ system being reacted.

Figure 2:
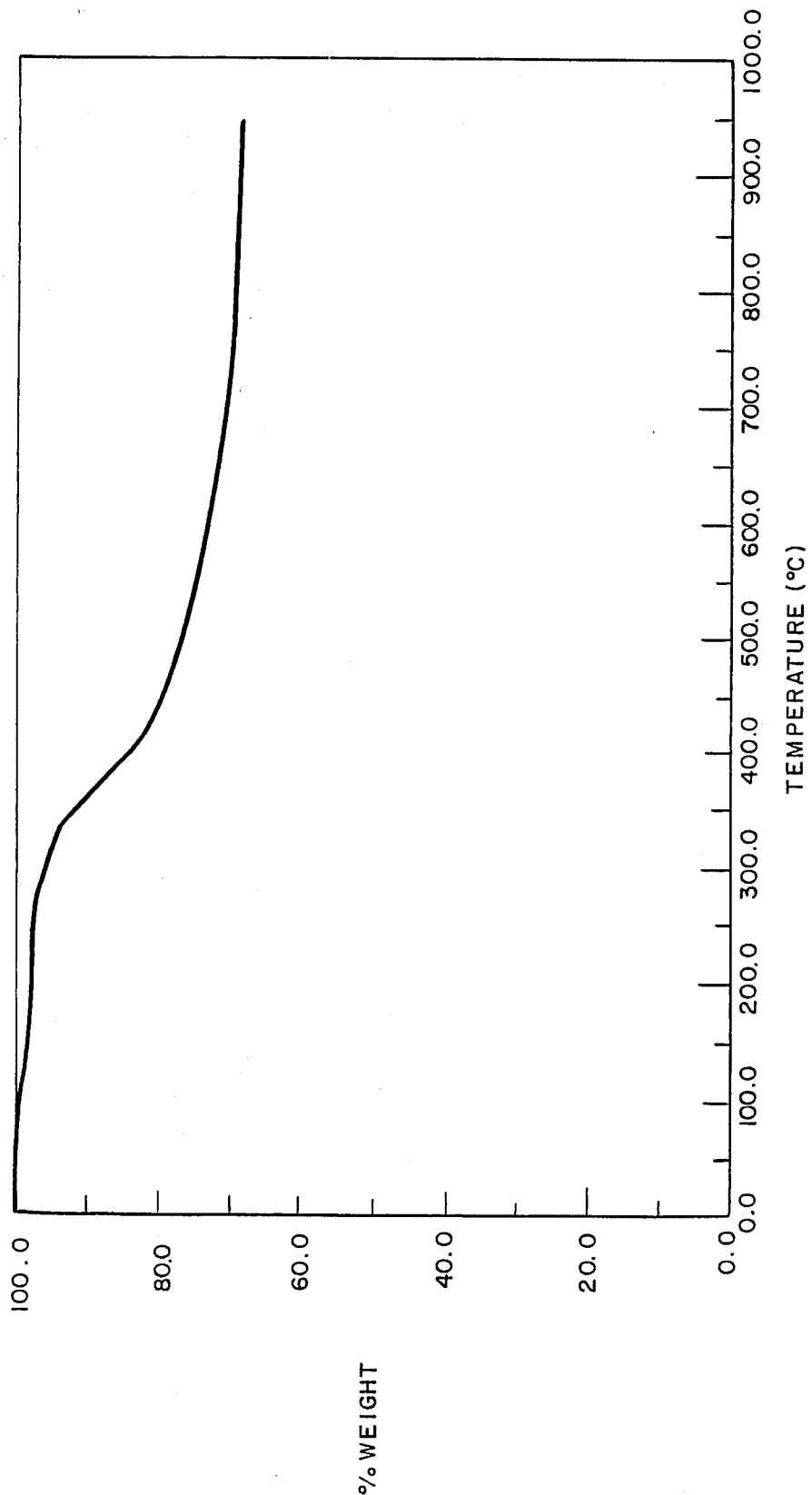
FIG. 2 is a thermogravimetric analysis (TGA) curve of polymer III-7.
Figure 3:
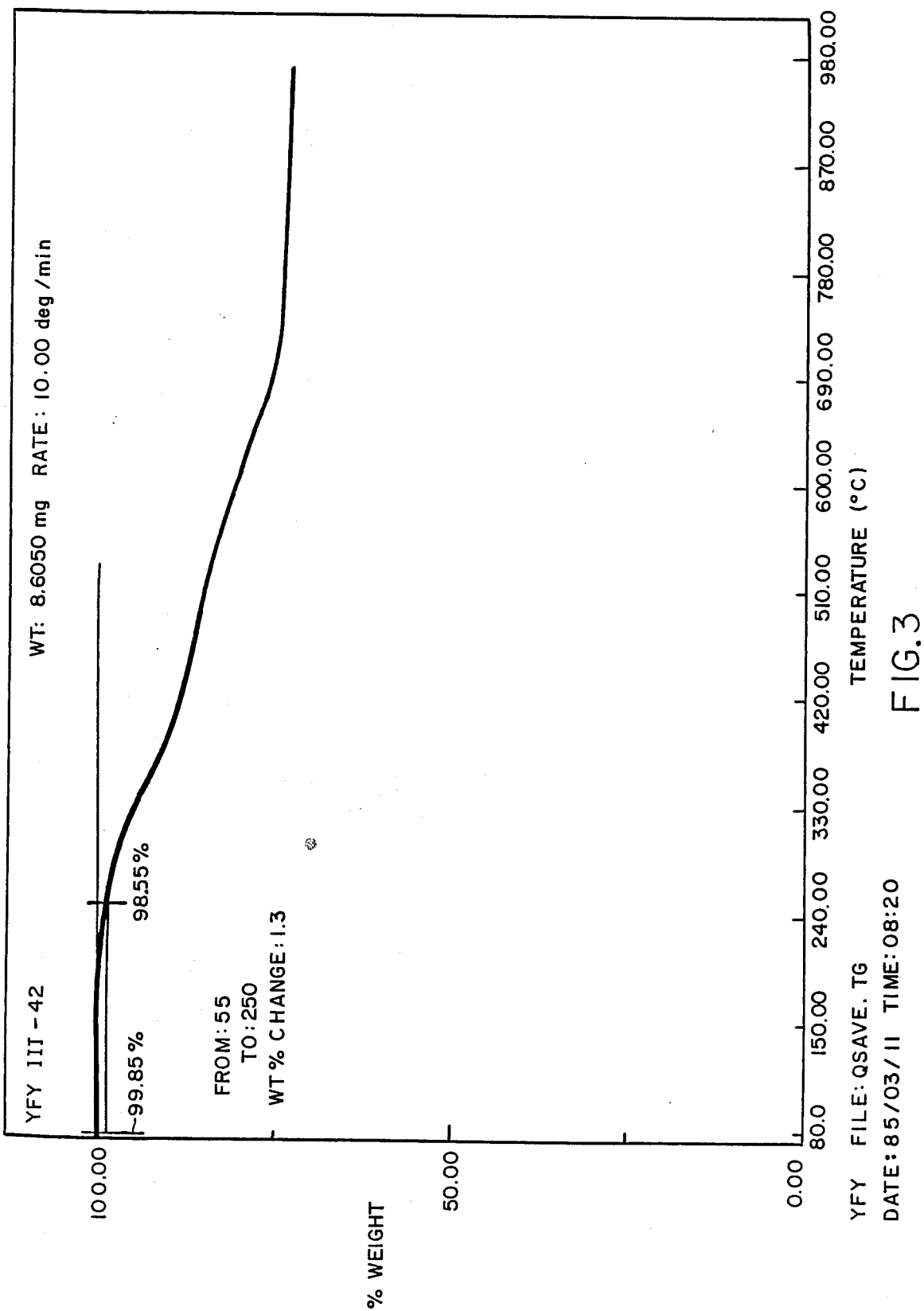
FIG. 3 is a TGA curve of polymer III-42.

The TGA curve of the "graft" polymer is shown in FIG. 2, while that of the "in situ" polymer is shown in FIG. 3. These two curves differ as well. In the "graft" polymer, the curves show that there is a small weight loss between 100° C. and 200° C. which begins at about 100° C. In contrast, with the "in situ" polymer, the initial small weight loss occurs only at higher temperatures, approximately beginning at 175° C. Both types of polymers are useful as preceramic materials.

The $[(RSiH)_x(RSi)_y]_n$ polysilanes can also be converted to new organosilicon polymer systems which are useful preceramic materials by reacting them with partially metallated polymers which are obtained by either partial or complete ring opening of diorganocyclopolysilazanes, $[R^1R^{11}SiNH]_m$ ($R^{11}$ is defined as $R^1$, and may be the same or different) followed by treatment with a base. $R^{11}$ is preferably the same as $R^1$. $R^1$ and $R^{11}$ are preferably lower alkyl groups, more preferably $CH_3$. Such polymers may be prepared by heating such cyclopolysilazanes in the presence of an ammonium halide, preferably $NH_4Br$, at 160° C. and treating the product with ammonia, as described by Kruger, C. R. and Rochow, E. G., *J. Polymer Sci.: Part A* 2:3179-3189 (1964); *Monatshefte fur Chemie*, 95:750-765 (1964). The polymers thus prepared are gums or waxes, can have molecular weights greater than 10,000 and are believed to be composed of cyclopolysilazane units linked together by linear $[R^1R^{11}SiNH]_x$ units. Related polymers can also be prepared by heating cyclic $[CH_3R^7SiNH]_m$ ($R^7 = CH_3$ or $C_5H_5$) with about 1% KOH at 200°-400° C. (Andrianov, K. A. et al., *J. Organomet. Chem.*, 3:129 (1965); *Izv. Akad. Nauk SSSR, Otd. Khim. Nauk* 290:1313 (1962)) or with eelctrophilic agents such as $AlCl_3$, $TiCl_4$, $SnCl_4$ or $H_2SO_4$ (Andrianov, K. A. et al., *Dokl. Akad. Nauk SSSR*, 145:1049 (1962); *Plasticheskie Massy*, 11:16 (1963); *Izv. Akad. Nauk SSSR*, 549 (1962)). Essentially linear $[R^1R^{11}{}_2SiNH]_x$ oligomers can be prepared by transition metal-catalyzed ring opening of cyclo-$[R^1R^{11}SiNH]_m$ as described by Zoeckler, T. M. and Laine, R. M., *J. Organ. Chem.*, 48:2539-2543, or by heating a cyclotrisilazane under 10 atm. of ammonia at 140° C., as described by Redl, G. and Rochow, E. G., *Aanqewandte Chemie*, 76:650 (1964). Polymers of these types may be treated with small amounts (a few mole percent based on available NH groups) of a base (such as KH) to give new types of polymeric silylamides, i.e., polysilazanes containing a few mole percent of $R^1R^{11}SiNM$ units (M is as defined earlier). These can react with the polysilanes of type $[(RSiH)_x(RSi)_y]_n$ and $[(RSiH)_a(RSi)_bRR'Si)_c]_m$ to give new hybrid organosilicon polymers with properties which make them useful precursors for $SiC/Si_3N_4$ ceramic materials.

For example, cyclo-$[(CH_3)_2SiNH]_m$ was heated at 160° C. in the presence of $NH_4Br$, and the product was treated with gaseous $NH_3$ in diethyl ether. Volatiles were stripped off in vacuo and the polymer which remained was treated with 5% KH in THF solution at reflux. The polysilane, $[(CH_3SiH)_x(CH_3Si)_y]_n$, was added and later methyl iodide was added. A solid organosilicon polymeric product which was soluble in organic solvents was obtained. Pyrolysis to 1000° C. converted it to a black ceramic material.

Polysilanes of type $(RSiH)_n$ (i.e., the general case where $y=0$, $x=1$) also react with the polymeric silylamides, $[(R^1SiHNH)_a(R^iSiN)_b(R^1SiHNM_c)]_m$. Thus, a reaction of $(C_6H_5SiH)_n$ with $[(CH_3SiNH)_a(CH_3SiN)_b(CH_3SiHNK)_c]_m$ (1:1 molar ratio) in THF at room temperature gave a new organosilicon polymer which was found to be an effective ceramic precursor, giving a $Si_3N_4/SiC/C$ ceramic product in high yield upon pyrolysis to 1000° C.

Physical blends of $[(RSiH)_x(RSi)_y]_n$, for example, the $[(CH_3SiH)_x(CH_3Si)_y]_n$ methylsilicon polymer with the "quenched" $[(R^1SiHNH)_a(R^1SiN)_b(R^1SiHNE)_c]_m$ organosilazane polymer of U.S. Pat. No. 4,482,669 can be used since these react when they are heated together. When approximately equal molar quantities of the polymers where $R=CH_3$, $R^1=CH_3$ and $E=CH_3$, were mixed and finely ground together and then subjected to pyrolysis to 1000° C., a ceramic yield was obtained which was approximately the average of the ceramic yields obtained when the polymers were pyrolyzed separately.

When such mixtures were heated, either in the absence of a solvent at 100° C. under nitrogen or in a toluene solution at reflux, white powders were obtained which were insoluble in nonpolar organic solvents, thus demonstrating that a reaction occurred.

The combined polymers obtained by the "graft," "in situ" and physical blend methods can be converted to black ceramic fibers. Pyrolysis of pressed bars of the combined polymers to 1000° C. provides a black solid product. In other experiments, SiC powder was dispersed in a toluene solution containing 25% by weight of the combined polymers. The solvent was evaporated and the residue, a fine powder of silicon carbide with combined polymer binder was pressed into bars and pyrolyzed at 1000° C. A ceramic bar was obtained showing a low weight loss and slightly shrunken size.

The invention will be further illustrated by the examples that follow:

A. General

All glassware was flame-dried under vacuum or under a stream of nitrogen prior to use. Tetrahydrofuran (THF) and diethyl ether were distilled from sodium/bemzophenone ketyl. Hexane was distilled from $LiAlH_4$. Solvents were deoxygenated by bubbling nitrogen gas through them prior to use. Methyldichlorosilane ($CH_3SiHCl_2$), $[(CH_3)_3Si]_2NH$, and $[(CH_3)_2SiNH]_3$ were purchased and were distilled from magnesium before use. Piperdine, diisopropylamine, and propylamine were purchased and were distilled from CaO before use. Reagent grade sodium shot was further purified by creating a dispersion in refluxing xylene and allowing this to cool, with stirring. This served to remove most of the oxide coating. Anhydrous ammonia was dried further by passing it through a KOH column. $^1H$ NMR spectra were recorded on a JEOL-FX-900 Spectrometer operating at 90 MHz. Elemental analyses were performed by Galbraith Laboratories, Knoxville, Tenn. Molecular weights were determined by measuring the freezing point depression of a weighed sample of benzene caused by a weighed sample of product.

Thermal analyses were performed by using either a Du Pont 950 TGA connected to a DuPont thermal analysis system or a Perkin-Elmer TGS-2 Thermogravimetric Analyzer interfaced with a System 7/4 Thermal Analysis Controller. Samples were heated, under nitrogen, from 25°-1000° C. at a rate of 10° C./min. Large scale pyrolyses were carried out in fused silica boats using a Lindberg 59344 tube furnace (25°-1000° C., 10° C./min.) under a nitrogen atmosphere. Scanning electron micrographs were obtained using an AMR instrument, operating at 20 KV.

B. Preparation of $[(CH_3SiH)_x(CH_3Si)_y]_n$ (all operations under nitrogen)

1. In THF Medium

A 500 ml, three-necked, round-bottomed flask equipped with a stir-bar, a dropping funnel and a reflux condenser was charged with 50.5 g (2.20 g atom) of Na metal. The flask was attached to a Schlenk manifold, evacuated and refilled with nitrogen three times. THF (200 ml) was added and the dropping funnel was charged with 65 ml (0.625 mol) of $CH_3SiHCl_2$. The silane was added to the stirred Na suspension during the course of 45 min., after which time the reaction mixture was cloudy and slightly warm. The mixture was stirred for 16 hours at room temperature and 48 hours at reflux; it then was cooled to room temperature. Hexane (60 ml)

was added. The mixture was transferred by cannula to a heavy-walled centrifuge bottle and centrifuged. The supernatant layer was transferred to a 1 liter round-bottomed flask (under nitrogen). THF (50 ml) and hexane (30 ml) were added to the residual solid and the resulting suspension was centrifuged. The supernatant layers were combined and solvents were removed by trap-to-trap distillation in vacuum until the residual liquid volume was about 100 ml. This liquid was cannulated into a 250 ml single-necked flask and the remaining solvent was removed in vacuo to leave 13.2 g (0.30 mol, 48% yield) of a white, glassy solid. On being heated in a sealed capillary (in vacuo) this solid softened around 40° C. and "melted" between 130°–140° C. with gas evolution, leaving a thick gum. There was no further change up to 300° C. except for a gradual increase in viscosity. The product was poorly soluble in hexane, only somewhat soluble in benzene (precluding measurement of its cryoscopic molecular weight in this solvent) and quite soluble in THF.

NMR (90 MHz, in CDCl$_3$): δ 0.10–0.61 (m, SiCH$_3$, 7.5H) and 3.55–3.90 (m, SiH, 1H). Based on the reasonable assumption that every Si atom bearing a H substituent also bears a CH$_3$ substituent, the integraded CH$_3$Si and SiH intensities lead to a constitution [(CH$_3$SiH)$_{0.4}$(CH$_3$Si)$_{0.5}$]$_n$.

Anal. Calcd for CSiH$_{3.4}$: C, 27.60; H, 7.87. Found: C, 27.18; H, 7.17.

IR (KBr, Nujol): 2170(sh), 2100(s, Si—H), 1408(m), 1260(m, Si—CH$_3$), 1249(s, Si—CH$_3$), 1060(br), 1019(s), 931(s), 865(vs, Si—CH$_3$), 770(vs), 685(vs), cm$^{-1}$.

TGA(25°–1000° C., 10° C./min.): 60% yield of a gray-black ceramic solid. A tube furnace pyrolysis of 3.20 g of this material to 1500° C. gave 1.52 g (48%) of a gray ceramic powder.

Anal. of the Ceramic Powder. Found: C, 22.56; Si, 78.42; H, 0.01; N, 0.009%. (SiC requires C, 29.94; Si, 70.06%; actual composition: SiC+0.49 Si). X-ray powder diffraction (d$_o$, Å): 1.315(s) (β-SiC), 1.542(s) (β-SiC), 1.91(m) (Si), 2.181(m), (β-SiC), 2.52(vs) (β:SiC), 3.13(m) (Si).

A mass spectral analysis of the pyrolysis gas in another experiment showed the following: no gaseous products were observed up to 385° C., then fragment ions corresponding well with the reported fragmentation of CH$_3$SiH$_3$. At 445° C., CH$_3$SiH$_2$ was still observed and a peak at m/z=16 (CH$_4$) began to grow in. By 580° C., when weight loss was about over, only the methane peak was observable.

2. In Hexane/THF Medium

In a dry box, a 1 liter three-necked, round-bottomed flask equipped with a stir-bar, a dropping funnel and a reflux condenser was charged with 75.0 g (3.26 mol) of sodium metal. The flask was attached to a Schlenk manifold, evacuated and flushed with nitrogen. THF (70 ml) and hexane (420 ml) were added and the dropping funnel was charged with 150 ml (1.44 mol) of methyldichlorosilane. Methyldichlorosilane was added slowly into the flask over a 3 hour period. The reaction solution turned purple and by the end of the addition was at gentle reflux. The reaction mixture was stirred at room temperature for 2 hours and then heated at reflux for 16 hours. After it had been cooled to room temperature, the reaction mixture (except for the large NaCl crystals) was transferred via cannula into a heavy-walled glass bottle. The mixture was centrifuged and the clear, colorless supernatant layer transferred by cannula into a 1 liter round-bottomed flask equipped with a stir-bar. Hexane (200 ml) and THF (20 ml) were added to the remaining solids, the mixture again was centrifuged, and the supernatant liquid combined with the supernatant solution previously separated. Solvent was removed by trap-to-trap distillation until the volume of the residue was about 100 ml, and the remaining liquid was transferred by cannula into a weighed 250 ml round-bottomed flask. Remaining solvent was removed by trap-to-trap distillation at approximately 0.05 mm Hg at room temperature to give 51.2 g (81%, 1.16 mol) of a cloudy white oil.

$^1$H NMR (90 MHz, C$_6$D$_6$): δ 0.37 (broad, SiCH$_3$, 3.74 H) 3.92 (broad, SiH, 1 H).

NMR integration of the product gave a constitution of [(CH$_3$SiH)$_{0.3}$(CH$_3$Si)$_{0.2}$]$_n$.

IR (thin film, cm$^{-1}$): 2967(s), 2900(s), 2800(w), 2099(vs), 1410(s), 1385(w), 1249(s), 1055(br), 933(s), 865(vs), 770(vs), 685(br), 650(sh), 585(w).

Molecular weight (cryoscopic in benzene): 600 g/mol.

Anal. (material from another similar preparation). Calcd. for CSiH$_{3.76}$; C, 27.39; H, 8.55; Si, 64.05. Found: C, 27.49; H, 8.98; Si, 61.58%.

TGA (25°–1000° C., 10° C./min): 20% yield of a gray-black ceramic solid. Pyrolysis of a sample from another preparation in a tube furnace gave a gray-black ceramic solid in 36% yield (by weight).

Anal. of Ceramic. Found: C, 22.93; Si, 75.99%.

The pure liquid obtained by this procedure is very air-sensitive, particularly when its effective surface area is high, as when in contact with a fritted funnel or a paper or cloth towel (in which cases spontaneous inflammaton may occur).

Other, similar reactions have given 62–75% yields of (CH$_3$SiH)$_x$(CH$_3$Si)$_y$. Molecular weight determinations of several preparations ranged from 520–740 g/mol. All products had very similar $^1$H NMR spectra, but with different SiCH$_3$:SiH ratios. Physical data of these products are listed in Table 1.

TABLE 1

PHYSICAL DATA FOR [(CH$_3$SiH)$_x$(CH$_3$Si)$_y$]$_n$ POLYMERS

| Sample # | Polymer Yield (%) | M.W.$^a$ | SiCH$_3$:SiH$^b$ | Ceramic$^c$ Yield (%) | x | y |
|---|---|---|---|---|---|---|
| YFY III-1 | 81 | 600 | 3.74:1 | 20 | 0.80 | 0.20 |
| YFY II-40 | 74 | 740 | 3.56:1 | 16 | 0.84 | 0.16 |
| YFY II-25 | 73 | 650 | 3.51:1 | 26 | 0.85 | 0.15 |
| YFY II-12 | 66 | 520 | 3.27:1 | 16 | 0.91 | 0.09 |
| YFY I-73 | 73 | 680 | 3.48:1 | 27 | 0.86 | 0.14 |

$^a$Cryoscopic in benzene.
$^b$$^1$H NMR integration ratio.
$^c$Under nitrogen gas, 25–1000° C. 10° C./min (TGA)

For the purpose of simplifying calculation, an average formula weight value 44 was assigned for the unit (CH$_3$SiH)$_x$(CH$_3$Si)$_y$. Therefore, in each of the following experiments, the number of moles of the reaction unit (CH$_3$SiH) was calculated from the weight of the polymer used divided by 44.

The product formed in the THF solution gives a 60% ceramic yield, but it is of limited solubility in organic solvents and its conversion to ceramic fibers requires a curing step of photolysis/oxidation. Preparation of the [(CH$_3$SiH)$_x$(CH$_3$Si)$_y$]$_n$ in a hexane/THF mixture of approximately 6 to 7:1 resulted in satisfactory yields of a soluble product. However, pyrolysis of this material resulted in very low ceramic yields, ranging from 16 to 27%.

C. Potassium Bis(trimethylsilyl)amide—Catalyzed Conversion of $[(CH_3SiH)_x(CH_3Si)_y]_n$ In a dry box, a 50 ml round-bottomed flask equipped with a stir-bar, a reflux condenser and a no-air rubber serum cap ("standard apparatus") was charged with 0.1 g of KH (0.0025 mol). THF (20 ml) was added to the flask to suspend the KH. To the KH suspension was added 0.44 g of $[(CH_3)_3Si]_2NH$ (0.0027 mol). Reaction occurred immediately with hydrogen gas evolution. The solution was stirred at room temperature for 20 minutes and then heated at reflux for 20 minutes. The slightly yellow solution was allowed to cool to room temperature.

Another 100 ml three-necked, round-bottomed flask equipped with a stir-bar, a reflux condenser and a no-air rubber serum cap was charged with 2.2 g of $[(CH_3SiH)_x(CH_3Si)_y]_n$ (0.05 mol, x=0.85, y=0.15). THF (20 ml) was added to the flask to dissolve the polymer. The $[(CH_3)_3Si]_2NK$ solution previously described was slowly added to the reaction flask by syringe. Addition of each drop resulted in formation of a transient orange color which quickly disappeared. The orange color persisted after 1 ml of the soluton had been added. After 10 ml (ca. 2.5 mol%) of the solution of $[(CH_3)_3Si]_2NK$ had been added, the reaction mixture turned deep red and a small amount of white precipitate was present. CH$_3$I (0.5 ml, 7.9 mmol) was added, and the resulting solution was stirred at room temperature for one hour. The solvent was removed under reduced pressure to give a white solid which was extracted with two 50 ml portions of hexane. The extracts were centrifuged, and the clear, colorless supernatant layer was transferred via cannula into a weighed 100 ml round-bottomed flask equipped with a stir-bar. Solvent was removed by trap-to-trap distillation to give 1.51 g (68%, by weight) of a white powder ("usual work-up"). The reaction product is soluble in hexane, benzene, and THF.

$^1$H NMR (90 MHz, C$_6$D$_6$): δ 4.2 (broad, SiH, 1 H) 0.47 (broad, SiCH$_3$, 8.8 H).

Molecular weight (cryoscopic in benzene): 1000 g/mol

TGA (25°–1000° C., 10° C./min): 63% yield of a black ceramic solid, $T_{\frac{1}{2}}=300°$ C.$^a$.

$^aT_{\frac{1}{2}}$=temperature at which one-half of the total weight loss has occurred.

D. Potassium Bis(vinyldimethylsilyl)amide—Catalyzed Conversion of $[(CH_3SiH)_x(CH_3Si)_y]_n$ According to the procedure described previously, the reaction between 0.46 g (0.0025 mol) of $[(CH_2=CH)Si(CH_3)_2]_2NH$ and 0.1 g (0.0025 mol) of KH in 20 ml of THF was carried out under nitrogen. The resulting solution was added to a separate flask which was charged with 2.2 g (0.05 mol) of $[(CH_3SiH)_x(CH_3Si)_y]_n$ (x=0.85, y=0.15) and 20 ml of THF. After 9 ml (ca. 2.5 mol%) of the $[(CH_2=CH)Si(CH_3)_2]_2NK$ solution had been added, the deep red reaction mixture started to form small amounts of white precipitate. CH$_3$I (0.5 ml, 7.9 mmol) was added and the resulting solution was stirred at room temperature for one hour. The usual work-up followed. A white powder (2.01 g, 91%) was obtained which is very soluble in hexane, benzene, and THF.

$^1$H NMR (90 MHz, C$_6$D$_6$): δ 4.08 (broad, SiH, 1 H) 0.47 (broad, SiCH$_3$, 12 H).

Molecular weight (cryoscopic in benzene): 850 g/mol.

TGA (25°–1000° C., 10° C./min): 61% yield of black ceramic solid, $T_{\frac{1}{2}}=400°$ C.

E. Monopotassium Derivative of Hexamethylcyclotrisilazane—Catalyzed Conversion of $[(CH_3SiH)_x(CH_3Si)_y]_n$ According to the procedure described previously, the reaction between 0.55 g (0.0025 mol) of $[(CH_3)_2SiNH]_3$ and 0.1 g (0.0025 mol) of KH in 20 ml of THF was carried out under nitrogen. The resulting solution was added to a separate flask which was charged with 2.2 g (0.05 mol) of $[(CH_3SiH)_x(CH_3Si)_y]_n$ (x=0.85, y=0.15) and 20 ml of THF. After 10 ml (ca. 2.5 mol%) of the potassium silylamide solution had been added, the reaction mixture turned deep red and a small amount of white solid precipitated. CH$_3$I (0.5 ml, 7.9 mmol) was added, and the resulting solution was stirred at room temperature for one hour. Work-up as above followed. A white powder (1.95 g, 89%) was obtained. The reaction product is soluble in hexane, benzene, and THF.

$^1$H NMR (90 MHz, C$_6$D$_6$): δ 4.60 (quartet, SiH, 0.7 H) 4.18 (broad, SiH, 1 H) 0.48 (broad, SiCH$_3$, 14 H).

Molecular weight (cryoscopic in benzene): 750 g/mol.

TGA (25°–1000° C., 10° C./min): 56% yield of a black ceramic solid, $T_{\frac{1}{2}}=300°$ C.

F. Monopotassium Derivative of sym-Trimethyltrivinylcyclotrisilazane—Catalyzed Conversion of $[(CH_3SiH)_x(CH_3Si)_y]_n$ Essentially the same procedures were used in the reaction of $[(CH_3)(CH_2=CH)SiNH]_3$ (0.66 g, 0.0025 mol) with KH (0.1 g, 0.0025 mol) in 20 ml of THF solution. The resulting solution was added to a 100 ml three-necked round-bottomed flask which was charged with 2.2 g (0.05 mol) of $[(CH_3SiH)_x(CH_3Si)_y]_n$ (x=0.85, y=0.15) and 40 ml of THF. After 6 ml (ca. 1.5 mol%) of the solution had been added, the deep red color of the reaction mixture persisted and a small amount of white solid precipitated. CH$_3$I (0.5 ml, 7.9 mmol) was added, and the resulting solution was stirred at room temperature for one hour. Work-up as above followed. A white powder (1.79 g, 81.4%) was obtained. The reaction product is soluble in hexane, benzene and THF.

$^1$H NMR (90 MHz, C$_6$D$_6$): δ 4.16 (broad, SiH, 1 H) 0.49 (broad, SiCH$_3$, 8.9 H).

Molecular weight (cryoscopic in benzene): 910 g/mol.

TGA (25°–1000° C., 10° C./min): 67% yield of a black ceramic solid, $T_{\frac{1}{2}}=410°$ C.

G. Potassium Piperidide—Catalyzed Conversion of $[(CH_3SiH)_x(CH_3Si)_y]_n$

In a dry box, a 50 ml round-bottomed flask equipped with a stir-bar, a reflux condenser and a no-air rubber serum cap was charged with 0.1 g of KH (0.0025 mol). THF (20 ml) was added to the flask to suspend the KH. To the KH suspension was added 0.25 ml of piperidine. Reaction occurred immediately with hydrogen gas evolution. The solution was stirred at room temperature for one hour and then heated at reflux for one hour. The slightly yellow solution was allowed to cool to room temperature.

Another 100 ml three-necked, round-bottomed flask equipped with a stir-bar, a reflux condenser and a no-air rubber serum cap was charged with 1.1 g of $[(CH_3SiH)_x(CH_3Si)_y]_n$ (0.025 mol, x=0.8, y=0.2). THF (20 ml) was added to the flask to dissolve the polymer. The potassium piperidide solution previously described was added slowly to the reaction flask by syringe. Addition of each drop resulted in formation of a transient orange color which quickly disappeared. The orange color persisted after 10 ml of the solution had been added. After 20 ml (ca. 10 mol%) of the solution of cyclo-$C_5H_{10}NK$ had been added, the reaction mixture was stirred at room temperature for one hour. The reaction solution turned deep red and a small amount of white precipitate was present. $CH_3I$ (0.5 ml, 7.9 mmol) was added, and the resulting solution was stirred at room temperature for one hour. The solvent was removed by trap-to-trap distillation at reduced pressure to give a white solid which was extracted with two 35 ml portions of hexane. The extracts were centrifuged, and the clear, colorless supernatant layer was transferred via cannula into a weighed 100 ml round-bottomed flask equipped with a stir-bar. Solvent was removed by trap-to-trap distillation to give 1.03 g (67%, by weight) of white powder which is soluble in hexane, benzene, and THF.

$^1H$ NMR (90 MHz, $C_6D_6$): $\delta$ 4.09 (broad, SiH, 1 H) 0.47 (broad, SiCH$_3$, 8.7 H).

Molecular weight (cryoscopic in benzene): 840 g/mol.

TGA (25°–1000° C., 10° C./min): 57% yield of a brownish-black ceramic solid, $T_{\frac{1}{2}}=350°$ C.

H. Potassium n-Propylamide—Catalyzed Conversion of $[(CH_3SiH)_x(CH_3Si)_y]_n$ Essentially the same procedure was used in the reaction of 0.30 g (0.0025 mol) of n-$C_3H_7NH_2$ with 0.1 g (0.0025 mol) of KH in 20 ml of THF as that described in Section G. In this case, 20 ml of the n-$C_3H_7NHK$ solution (ca. 10 mol%) was used to react with 1.1 g (0.025 mol) of $[(CH_3SiH)_x(CH_3Si)_y]_n$ (x=0.8, y=0.2) in 20 ml of THF. After the addition was completed, the reaction solution turned orange and was stirred at room temperature for one hour. The solution turned deep red and a small amount of white precipitate was present. $CH_3I$ (0.5 ml, 7.9 mmol) was added, and the resulting solution was stirred at room temperature for one hour. The usual work-up left 0.95 g (73% by weight) of a white solid which is soluble in hexane, benzene, and THF.

$^1H$ NMR (90 MHz, $C_6D_6$): $\delta$ 4.08 (broad, SiH, 1 H) 0.51 (broad, SiCH$_3$, 13.6 H).

Molecular weight (cryoscopic in benzene): 840 g/mol.

TGA (25°–1000° C., 10° C./min): 57% yield of a brownish-black ceramic solid, $T_{\frac{1}{2}}=300°$ C.

I. Potassium Diisopropylamide—Catalyzed Conversion of $[(CH_3SiH)_x(CH_3Si)_y]_n$ Essentially the same procedure was used in the reaction of 0.30 g (0.0025 mol) of (iso-$C_3H_7)_2NH$ with 0.1 g (0.0025 mol) of KH in 20 ml of THF as that described in Section G. In this case, 20 ml of the (iso-$C_3H_7)_2NK$ solution (ca. 10 mol%) was used to react with 1.1 g (0.025 mol) of $[(CH_3SiH)_x(CH_3Si)_y]_n$ (x=0.8, y=0.2) in the 20 ml of THF. After the addition was completed, the reaction solution turned orange and was stirred at room temperature for one hour. The solution turned deep red and a small amount of white precipitate was present. $CH_3I$ (0.5 ml, 7.9 mmol) was added, and the resulting solution was stirred at room temperature for one hour. Work-up as above left 1.03 g (79% by weight) of a white solid which is soluble in hexane, benzene, and THF.

$^1H$ NMR (90 MHz, $C_6D_6$): $\delta$ 3.99 (broad, SiH, 1 H) 0.47 (broad, SiCH$_3$, 8.7 H).

Molecular weight (cryoscopic in benzene): 750 g/mol.

TGA (25°–1000° C. 10° C./min): 34% yield of a brownish-black solid, $T_{\frac{1}{2}}=280°$ C.

J. Reactions of $[(CH_3SiHNH)_a(CH_3SiN)_b(CH_3SiHNK)_c]_m$ Living Polymer with $[(CH_3SiH)_x(CH_3Si)_y]_n$ ("Graft Procedure")

1. $[(CH_3SiH)_x(CH_3Si)_y]_n$ Prepared in 7:1 Hexane/THF a. Using cyclo-$[CH_3SiHNH]_m$ Prepared in Diethyl Ether The same general procedures were used for all of these reactions. In a dry box, a 250 ml round-bottomed flask equipped with a stir-bar, reflux condenser and a serum cap was charged with a weighed amount of KH (ca. 3.3 mol%) based on ($CH_3SiHNH$)). THF (100 ml) was added to suspend the KH. ($CH_3SiHNH)_m$, prepared in ether solution, was added into the flask by syringe (a vigorous reaction occurred and a large amount of $H_2$ gas was evolved which was vented out of the flask through an oil bubbler. After the addition was finished, the reaction mixture was stirred at room temperature for 1 hour and then heated at reflux for 1 hour.

A separate 250 ml flask equipped with a septum, reflux condenser and stir-bar was charged with a weighed amount of $[(CH_3SiH)_x(CH_3Si)_y]_n$ (x=0.85, y=0.15). THF (60 ml) was added by syringe to give a clear, colorless solution. The living polymer solution previously described was cannulated slowly into the reaction flask. The resulting orange solution was stirred at room temperature for one hour and then heated at reflux for one hour. The reaction mixture was allowed to cool to room temperature and 0.5 ml (7.9 mmol) of $CH_3I$ was added and the volatiles were removed by trap-to-trap distillation. The product was treated with 200 ml of hexane and the insoluble residue removed by centrifugation. The hexane was removed from the supernatant solution by trap-to-trap distillation, leaving a white solid. Physical data for these reaction products are given in the Tables 2, 3, 4, and 5. All of these polymers ae very soluble in hexane, benzene, and THF.

b. Using cyclo-$[CH_3SiHNH]_m$ Prepared in THF

According to the procedure described previously, the reactions between KH and ($CH_3SiHNH)_m$ (prepared in THF solution) were carried out under nitrogen. The living polymer solution then was added to the THF solution of $[(CH_3SiH)_x(CH_3Si)_y]_n$ (x=0.8, y=0.2). The resulting orange solution was stirred at room temperature for one hour and then heated at reflux for one hour. The reaction mixture was allowed to cool to room temperature and 0.5 ml (7.9 mmol) of $CH_3I$ was added. Work-up as described in the previous experiment left a white solid. Physical data for these reaction products are given in the Tables 2, 3, 4, and 5.

TABLE 2
PREPARATION OF THE MIXED POLYMERS

| Sample # | YFY III-7 | YFY III-11 | YFY III-14 | YFY II-29 | YFY II-30 | YFY II-30-1 |
|---|---|---|---|---|---|---|
| Solvent for $(CH_3SiHNH)_m$ Preparation | THF | THF | THF | Ether | Ether | Ether |
| Weight of $[(CH_3SiH)_x(CH_3Si)_y]_n$ | 10.1 g | 6.6 g | 3.3 g | 2.4 g | 1.1 g | 2.2 g |
| Moles of $[(CH_3SiH)_x(CH_3Si)_y]_n$ (A) | 0.23 | 0.15 | 0.075 | 0.055 | 0.025 | 0.05 |
| Weight of $(CH_3SiHNH)_m$ | 8.85 g | 8.85 g | 8.85 g | 2.4 g | 2.08 g | 1.22 g |
| Moles of $(CH_3SiHNH)_m$ (B) | 0.15 | 0.15 | 0.15 | 0.041 | 0.035 | 0.021 |
| Mole Ratio A:B | 1.5:1 | 1:1 | 1:2 | 1.34:1 | 1:1.41 | 2.42:1 |
| Yield (%) | 85 | 88 | 87 | 90 | 95 | 88 |

TABLE 3
CERAMIC YIELD AND MOLECULAR WEIGHT DATA OF MIXED POLYMERS

| Sample #[d] | Ceramic[a] Yield (%) | $T_{\frac{1}{2}}$[b] (C.°) | Molecular[c] Weight (g/mol) |
|---|---|---|---|
| YFY III-7 | 74 | 420 | 1800 |
| YFY III-11 | 78 | 420 | 2600 |
| YFY III-14 | 83 | 560 | 2500 |
| YFY II-29 | 78 | 460 | 2000 |
| YFY II-30 | 78 | 470 | 2000 |
| YFY II-30-1 | 76 | 400 | 2000 |

[a]Under nitrogen, 25–1000° C., 10° C./min (TGA)
[b]Temperature at which ½ of total weight loss had occurred
[c]Cryoscopic in benzene
[d]For details of preparation, see Table 2

TABLE 4
$^1H$ NMR SPECTRAL DATA[a] OF THE MIXED POLYMERS

| Sample #[c] | (CH$_3$SiHNH) | (CH$_3$SiH) | (CH$_3$SiHNH) and SiCH$_3$ | Integration Ratio[b] |
|---|---|---|---|---|
| YFY III-7 | 5.12 (b) 4.67 (b) | 4.12 (b) | 1.56, 1.22, 0.88, 0.46 (b), 0.24 | 1:1:14.4 |
| YFY III-11 | 5.14 (b) 4.67 (b) | 4.07 (b) | 1.56, 1.22, 0.88, 0.41 (b), 0.24 | 1.75:1:7 |
| YFY III-14 | 5.19 (b) 4.71 (b) | 4.08 (b) | 1.55, 1.23, 0.89, 0.45 (b), 0.26 | 3:1:18 |
| YFY II-29 | 5.17 (b) 4.72 (b) | 4.05 (b) 3.56 (b) | 1.35, 0.52 (b), 0.27 | 2:1:14.6 |
| YFY II-30 | 5.17 (b) 4.71 (b) | 4.03 (b) 3.56 (b) | 1.41, 1.34, 1.22, 0.46 (b), 0.27 | 2.13:1:13.8 |
| YFY II-30-1 | 5.15 (b) 4.72 (b) | 4.12 (b) 3.57 (b) | 1.23, 0.46 (b) 0.26 | 1.9:1:16.1 |

[a]90 MHz, in $C_6D_6$, chemical shift in ppm.
[b](CH$_3$SiHNH)/(CH$_3$SiH)/(CH$_3$Si) + (NH) proton integration
[c]For details of preparation, see Table 2

TABLE 5
PROPOSED FORMULAS AND THEIR ANALYTICAL DATA FOR THE MIXED POLYMERS
Proposed Formula
$(CH_3SiH)_x(CH_3Si)_y(CH_3SiHNH)_a(CH_3SiN)_b$

| Sample #[f] | | Polymer[a] Anal. Calcd. | Found | Total[g] Accounted For | Ceramic Anal. Found | Accounted For |
|---|---|---|---|---|---|---|
| YFY III-7 | x, 0.163 | C, 24.46 | C, 25.75 | 96.8 | C, 20.59 | 97.27[b] |
| | y, 0.437 | H, 7.11 | H, 7.69 | | H, 0.78 | |
| | a, 0.163 | Si, 57.02 | Si, 53.42 | | si, 62.79 | |
| | b, 0.238 | N, 11.41 | N, 9.94 | | N, 13.11 | |
| YFY III-11 | x, 0.116 | C, 23.78 | C, 24.79 | 98.49 | C, 19.28 | 101.0[c] |
| | y, 0.384 | H, 6.97 | H, 7.34 | | H, 0.99 | |
| | a, 0.203 | Si, 55.41 | Si, 53.17 | | Si, 63.47 | |
| | b, 0.297 | N, 13.85 | N, 13.19 | | N, 17.26 | |
| YFY III-14 | x, 0.09 | C, 22.65 | C, 24.21 | 100.46 | C, 18.27 | 90.44 |
| | y, 0.24 | H, 6.85 | H, 7.85 | | H, 0.55 | |
| | a, 0.27 | Si, 52.81 | Si, 51.89 | | Si, 58.65 | |
| | b, 0.40 | N, 17.69 | N, 16.51 | | N, 12.97 | |
| YFY III-29 | x, 0.087 | C, 24.26 | C, 24.03 | 87.06 | C, 19.68 | 95.01[d] |
| | y, 0.482 | H, 6.94 | H, 7.97 | | H, 0.19 | |
| | a, 0.174 | Si, 56.56 | Si, 43.56 | | Si, 58.71 | |
| | b, 0.256 | N, 12.17 | N, 11.50 | | N, 16.43 | |
| YFY III-30 | x, 0.112 | C, 22.73 | C, 24.56 | 90.53 | C, 17.31 | 95.39[e] |
| | y, 0.303 | H, 8.76 | H, 6.97 | | H, 0.20 | |
| | a, 0.239 | Si, 53.00 | Si, 44.56 | | Si, 57.87 | |
| | b, 0.346 | N, 15.50 | N, 14.44 | | N, 20.01 | |
| YFY II-30-1 | x, 0.062 | C, 25.33 | C, 23.35 | 79.45 | C, 19.97 | 90.36 |
| | y, 0.646 | H, 6.98 | H, 6.88 | | H, 0.65 | |
| | a, 0.122 | Si, 59.06 | Si, 41.53 | | Si, 58.44 | |
| | b, 0.172 | N, 8.62 | N, 7.69 | | N, 11.30 | |

[a]Calculated on the basis of NMR integration
[b]Calcd. composition ($Si_3N_4$ = 1): $Si_3N_4$ + 6.6 SiC + 0.74 C this represents only 2.2% by weight free carbon
[c]Calcd. composition: $Si_3N_4$ + 4.4 SiC + 0.85 C (equivalent to 3.1% by weight free carbon)
[d]Calcd. composition (assuming % Si is in error): $Si_3N_4$ + 4.8 SiC + 0.84 C (equivalent to 2.9% by weight free carbon)
[e]Calcd. composition (same assumption): $Si_3N_4$ + 3.3 SiC + 0.78 C (equivalent to 3.3% by weight free carbon)
[f]For details of preparation, see Table 2
[g]Analytical difficulties, probably due to formation of ceramic material

2. $[(CH_3SiH)_x(CH_3Si)_y]_n$ Prepared in THF a. Using cyclo-$[(CH_3SiHNH)]_m$ Prepared in Diethyl Ether

In a dry box, a 250 ml round-bottomed flask equipped with a stir-bar, reflux condenser and a serum cap was charged with 0.01 g (0.25 mmol) of KH. THF (100 ml) was added to suspend the KH. To the KH suspension, $(CH_3SiHNH)_m$ (1.57 g, 0.027 mol, prepared in ether solution), was added by syringe (a vigorous reaction occurred and a large amount of $H_2$ gas was evolved which was vented out of the flask through an oil bubbler). After the addition was finished, the reaction mixture was stirred at room temperature for 1 hour and then at reflux for 1 hour.

A separate flask equipped with a septum, reflux condenser and stir-bar was charged with 1.1 g (0.025 mol) of $[(CH_3SiH)_x(CH_3Si)_y]_n$ (x=0.46, y=0.54). THF (60 ml) was added by syringe to give a clear, colorless solution. The living polymer solution described above was cannulated slowly into the reaction flask. The resulting orange solution was stirred at room temperature for one hour and then heated at reflux for one hour. The reaction mixture was allowed to cool to room temperature and 0.5 ml (7.9 mmol) of $CH_3I$ was added and the solvent was removed by trap-to-trap distillation, leaving a white solid (2.5 g, 94% by weight). The reaction product is soluble in hexane, benzene, and THF.

$^1H$ NMR (90 MHz, $C_6D_6$): $\delta$ 5.20, 4.74 (broad, SiCH$_3$HNH, 1.25 H), 4.07 (broad, SiCH$_3$H, 1 H), 1.59, 1.23 (broad, SiCH$_3$HNH, 1 H), 0.46, 0.26 (broad, SiCH$_3$, 11 H).

Molecular weight (cryoscopic in benzene): 1700 g/mol.

TGA (25°–1000° C., 10° C./min): 76% yield of a black ceramic solid, $T_{\frac{1}{2}}$=400° C.

b. Using cyclo-$[CH_3SiHNH]_m$ Prepared in THF

According to the procedure described previously, the reactions between KH (0.1 g, 2.5 mmol) and $(CH_3SiHNH)_m$ (2.9 g, 0.051 mol, prepared in THF solution) were carried out under nitrogen. The living polymer solution then was added to the THF solution of $[(CH_3SiH)_x(CH_3Si)_y]_n$ (2.2 g, 0.05 mol, x=0.46, y=0.54). The resulting orange solution was stirred at room temperature for one hour and then heated at reflux for one hour. The reaction mixture was allowed to cool to room temperature and 0.5 ml (7.9 mmol) of $CH_3I$ was added. Work-up as described in the previous experiment left a white solid (4.65 g, 91% by weight). The reaction product is soluble in hexane, benzene, and THF.

$^1H$ NMR (90 MHz, $C_6D_6$): $\delta$ 5.15, 4.71 (broad, SiCH$_3$HNH, 2 H), 4.50, 3.93 (broad, SiCH$_3$H, 1 H), 1.58, 1.23 (broad, SiCH$_3$HNH, 1 H). 0.47, 0.25 (broad, SiCH$_3$, 16 H).

Molecular weight (cryoscopic in benzene): 2700 g/mol.

TGA (25°–1000° C., 10° C./min): 80% yield of a black ceramic solid, $T_{\frac{1}{2}}$=420° C.

K. Reaction of a Mixture of Cyclic $[CH_3SiHNH]_m$ and $[(CH_3SiH)_x(CH_3Si)_y]_n$ with KH Catalyst ("In Situ Procedure")

a. Using cyclo-$[(CH_3SiHNH)]_m$ Prepared in Diethyl Ether

In a dry box, a 250 ml round-bottomed flask equipped with a stir-bar, reflux condenser and a serum cap was charged with 0.10 g of KH (0.0025 mol). THF (50 ml) was added to suspend the KH. A separate 250 ml Schlenk flask was charged with 2.0 g of cyclic $(CH_3SiNHN)_m$ (0.034 mol), prepared by ammonolysis of $CH_3SiHCl_2$ in ether solution, and 2.2 g of $[(CH_3SiH)_x(CH_3Si)_y]_n$ (0.05 mol, x=0.74, y=0.26), and 100 ml of THF. The mixed polymer solution was transferred by cannula into the KH suspension. The reaction mixture gradually changed color to light orange and hydrogen gas was slowly evolved. The resulting solution was stirred at room temperature for 14 hours and then heated at reflux for 1 hour. The light orange color of the solution persisted. The reaction mixture was allowed to cool to room temperature and 0.5 ml (7.9 mmol) of $CH_3I$ was added. The solvent was removed by trap-to-trap distillation. The product was extracted with 200 ml of hexane and the insoluble residue removed by centrifugation.

The clear, colorless supernatant layer was transferred via cannula into a weighed 250 ml round-bottomed flask The hexane was removed by trap-to-trap distillation leaving 3.8 g (91% by weight) of a white powder. The latter is soluble in THF, benzene, and hexane.

$^1H$ NMR (90 MHz, $C_6D_6$): $\delta$5.19, 4.70, 3.97 (broad, SiH, 1 H) 1.30, 0.47, 0.26 (broad, SiCH$_3$ and NH 3.6 H).

Molecular weight (cryoscopic): 1650 g/mol.

TGA (25°–1000° C., 10° C./min): 62% yield of a black ceramic solid, $T_{\frac{1}{2}}$=380° C.

Anal. of Polymer Product: Found: C, 23.56; H, 7.37; N, 14.51 Si, 50.89%.

A sample of the ceramic product obtained in a tube furnace pyrolysis was analyzed:
Found: C, 19.30; N, 19.58; Si, 57.94; O, 2.05%.

From this analysis one may calculate a ceramic composition:

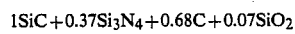

1SiC+0.37Si$_3$N$_4$+0.68C+0.07SiO$_2$ (equivalent to 7.9% by weight free carbon).

b. Using cyclo-$(CH_3SiHNH]_m$ Prepared in THF

According to the procedure described above, the reaction between 0.1 g of KH (0.0025 mol), 2.0 g of cyclic $(CH_3SiHNH)_m$ (prepared in THF solution), and 2.2 g of $[(CH_3SiH)_x(CH_3Si)_y]_n$ (x=0.74, y=0.26) was carried out under nitrogen. The resulting reaction mixture also gradually changed color to light orange with slow evolution of hydrogen gas. The solution was stirred at room temperature for 14 hours and then 0.5 ml (7.9 mmol) of $CH_3I$ was added. Work-up as described in the previous experiment left a white, soluble solid (3.75 g, 89%).

$^1H$ NMR (90 MHz, $C_6D_6$): $\delta$5.13, 4.72, 3.98 (broad, SiH, 1 H), 1.29, 0.48, 0.26 (broad, SiCH$_3$ and NH, 3.7 H).

Molecular weight: 2750 g/mol.

TGA (25°–1000° C., 10° C./min): 73% yield of a black ceramic solid, $T_{\frac{1}{2}}$=360° C.

Anal. of Polymer Product: Found: C, 24.16; H, 7.14; N, 15.26; Si, 51.20%.

A sample of the ceramic product obtained in a tube furnace pyrolysis was analyzed:
Found: C, 19.81; N, 19.77; Si, 58.14; O, 1.67.

From this analysis one may calculate a ceramic composition:

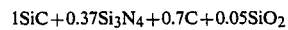

1SiC+0.37Si$_3$N$_4$+0.7C+0.05SiO$_2$ (equivalent to 8.1% by weight free carbon).

L. Reaction of a Metallated Polymerization Product of cyclo-$[(CH_3)_2SiNH]_m$ and $[(CH_3SiH)_y(CH_3Si)_y]_n$ a. Polymerization of cyclo-$[(CH_3)_2SiNH]_m$ A 100 ml, three-necked, round-bottomed flask equipped with a stir-bar, a thermometer, and two gas inlet tubes was charged with 45.0 ml (41.4 g, 0.188 mol) of $[(CH_3)_2SiHN]_3$ and 2.07 g (0.052 mol, 5% by weight) of $NH_4Br$. After flushing the system with nitrogen, a constant stream of nitrogen was maintained. The reaction mixture was then heated at 160° C. for 8 hours during which time $NH_3$ gas slowly evolved. The reaction mixture was allowed to cool to room temperature, and then dissolved in 300 ml of diethyl ether. The solution was cannulated into a 500 ml, three-necked, round-bottomed flask equipped with a cold condenser (dry ice-acetone) and two no-air rubber serum caps. The solution was cooled to 0° C. An excess of anhydrous ammonia was bubbled into the reaction mixture during about one hour. The reaction mixture was filtered with a Schlenk fritted filter. The solvent was removed by trap-to-trap distillation to leave a viscous oil. The latter was then distilled under reduced pressure (0.05 mmHg) and the low boiling compound (starting material and oligomers) were collected from 100° C. to 250° C. A very viscous gum remained (20.2 g, 49% by weight).

$^1$NMR (90 MHz, $C_6D_6$): δ0.42 (broad, $SiCH_3$, 1 H), 0.23 (broad, $SiCH_3$, 1.2 H).

Molecular weight (cryoscopic in benzene): 5100 g/mol.

TGA (25°–1000° C., 10° C./min): 100% weight loss occurred at 630° C.

b. Reaction of Metallated Polymer from Section L.a. with $[(CH_3SiH)_x(CH_3Si)_y]_n$ (IV-40)

In a dry box, a 100 ml round-bottomed flask equipped with a stir-bar, reflux condenser and a serum cap was charged with 0.1 g (2.25 mmol) of KH (5% by weight). THF (10 ml) was added to suspend the KH. A solution of the polymer from L.a. (above) (2.0 g in 30 ml of THF) was added to the flask by cannulation. After the addition was finished, the reaction mixture was heated at reflux for 1.5 hours. The solution gradually turned clear while $H_2$ gas was slowly evolved.

A separate 100 ml round-bottomed flask equipped with a septum, reflux condenser and stir-bar was charged with 2.2 g of $[(CH_3SiH)_x(CH_3Si)_y]_n$ (x=0.81, y=0.19). THF (30 ml) was added by syringe to give a clear solution. The KH/polymer product solution of Section L.a. previously described was cannulated slowly into the reaction flask. Addition of each drop resulted in formation of an orange color which quickly disappeared. To the resulting solution 0.5 ml (7.9 mmol) of $CH_3I$ was added and the solvent was removed by trap-to-trap distillation. The product was extracted with 80 ml of hexane and the insoluble residue removed by centrifugation. The hexane was removed from the supernatant solution by trap-to-trap distillation, leaving 3.6 g (89% yield by weight) of a white solid. The polymer is very soluble in hexane, benzene, and THF.

$^1$H NMR (90 MHz, $C_6D_6$): δ5.12, 4.68, 4.09 (broad, SiH, 1 H), 1.17 (broad, NH), 0.47, 0.27 (broad, $SiCH_3$, 17.5 H, for the total area of $SiCH_3$ and NH).

Molecular weight (cryoscopic in benzene): 1500 g/mol.

Pyrolysis of this polymer to 1000° C. left a black ceramic material.

M. Reaction of Polymeric $[(C_6H_5SiH)]_n$ with $[(CH_3SiHNH)_a(CH_3SiN)_b(CH_3SiHNK)_c]_m$ Living Polymer Poly(phenylsilylene), $[C_6H_5SiH]_n$, molecular weight 860, was prepared by the method of Aitken, et al., *J. Organomet. Chem.*, supra.

The polymeric silylamide was prepared by the usual method, in this case by adding 1.0 g (3.0 mmol) of cyclo-$(CH_3SiHNH)_m$ (mol. wt. 330), obtained by ammonolysis of $CH_3SiHCl_2$ in diethyl ether, to a suspension of 0.02 g (0.5 mmol) of KH in 10 ml of THF at room temperature. The mixture was stirred at room temperature for two hours. This solution then was added, under dry nitrogen, to 1.0 g of $(C_6H_5SiH)_x$ (1.2 mmol) in 20 ml of THF in a 100 ml three-necked flask equipped with reflux condenser topped with a nitrogen inlet tube, two rubber septa and a magnetic stir-bar, at room temperature. The reaction mixture turned orange upon addition of a few drops of the polysilylamide solution. (The final color was red.) After the reaction mixture had been stirred at room temperature for three days, 0.1 g of methyl iodide was added. One-half of the THF was removed in vacuo and 20 ml of hexane was added. Centrifugation gave a clear supernatant solution which was evaporated in vacuo to leave an off-white powder, 1.90 g (95% yield).

Analysis: Found: C, 45.54; H, 6.08; N, 12.31; Si, 36.37%.

$^1$H NMR ($C_6D_6$): δ0.2–1.4 (broad, $SiCH_3$, 0.58 H) 4.6–5.8 (broad, SiH, 0.16 H) 6.5–7.7 (broad, $SiC_6H_5$, 1 H).

Molecular weight (cryoscopic in benzene): 1470 g/mol.

TGA (25°–1000° C., 10°/min): 78% yield of a black ceramic solid.

Pyrolysis of a larger sample in a tube furnace to 1000° C. gave a black ceramic solid in 74% yield.

Analysis: Found: C, 39.93; H, 0.54; N, 15.41; Si, 44.29%.

From these data a composition 1 $Si_3N_4$+2.75 SiC+9.4 C may be calculated.

A similar preparation in which the polysilylamide/poly(phenylsilylene) mole ratio used was 5 gave a soluble white powder, molecular weight 2360, as a product whose pyrolysis to 1000° C. gave an 86% ceramic yield.

P. Experiments with Polymer Blends (a)

$[(CH_3SiH)_x(CH_3Si)_y]_n/[(CH_3SiHNH)_a(ch_3SiN)_b(CH_3SiHNCH_3)_c]_m$

Blend Prepared at Room Temperature

In a dry box, 1.1 g (0.025 mol) of $[(CH_3SiH)_x(CH_3Si)_y]_n$ (x=0.46, y=0.54) (THF preparation) and 1.45 g (0.025 mol) of $[(CH_3SiHNH)_{0.39}(CH_3SiN)_{0.61}]_m$ (THF preparation) were finely ground together. The TGA curve of the physical blend polymer was measured. TGA (25°–1000° C., 10° C./min): 70% yield of a black ceramic solid. (average value of the the two individual polymers)

(b) A Blend Heated Neat to 100° C.

In a dry box, 1.1 g (0.025 mol) of $[(CH_3SiH)_x(CH_3Si)_y]_n$ (x=0.46, y=0.54) and 1.45 g (0.025 mol) of $[(CH_3SiHNH)_{0.39}(CH_3SiN)_{0.61}]_m$ (THF preparation)

were finely ground together. The solid mixture was transferred to a 100 ml round-bottomed flask and then was heated in an oil bath at 100° C. for 30 minutes. The heat-treated mixed polymer is insoluble in THF, benzene, and hexane. TGA (25°–1000° C., 10° C./min): 67% yield of a black ceramic solid.

(c) A Blend Heated in Toluene at Reflux

The polymer mixture prepared as in the previous experiment was dissolved in 20 ml of toluene in a 50 ml three-necked, round-bottomed flask. The solution was heated in reflux for one hour. The solution gradually turned cloudy. Solvent was removed by trap-to-trap distillation to give a white powder which is insoluble in THF, benzene, and hexane.

TGA (25°–1000° C., 10°/min): 75% yield of a black ceramic solid.

Q. Ceramic Preparations

1. Preparation of Ceramic Fibers a. From Mixed Polymer Prepared as in Example J.1 (a)

In a dry box, an approximately 1 g sample of the polymer was dissolved in toluene (ca. 10 ml). The solution was concentrated under vacuum until a fibrous, gummy material was obtained. Fibers approximately 1 foot long were pulled with a glass rod dipped into the gummy mass. The fibers were quickly placed in a fused silica crucible which was in turn placed in a quartz tube in a tube furnace and flushed with nitrogen. The polymer fibers then were pyrolyzed at 10° C./min to 1000° C. This produced black ceramic fibers.

b. From Mixed Polymer Prepared as in Example J.1 (b)

The same procedure was used in preparation of polymer fibers in this polymer. The fibers were quickly placed in a fused silica crucible which was in turn placed in a quartz tube in a tube furnace and flushed with nitrogen. The polymer fibers then were pyrolyzed at 10° C./min to 1000° C. This produced black ceramic fibers.

2. Preparation of Ceramic Bars by Polymer Pyrolysis

The two organosilicon polymers used for these experiments were prepared as described earlier.

a. Mixed Polymer Prepared as in Example J.1 (a)

The polymer (3.0 g) was loaded into a 3.9 cm×1.3 cm×3.7 cm rectangular steel die and uniaxially pressed at 5000 lbs. for 5 minutes. The polymer bar then bagged and isostatically pressed at 40,000 psi for one minute. The sample was placed in a quartz tube in a tube furnace and pyrolyzed under nitrogen to 1000° C., heating at 10° C./min. A black, irregular-shaped foam product was obtained with a loss of 24% of the original weight.

b. Mixed Polymer prepared as in Example J.1 (b)

The polymer bar (3.0 g) was prepared by the same procedures used in the preparation of polymer bar above. The polymer bar was placed in a quartz tube in a tube furnace and pyrolyzed under nitrogen to 1000° C., heating at 10° C./min. A black, irregular-shaped foam product was obtained with a loss of 26% of the original weight.

3. Preparation of SiC Powder Composites a. Mixed Polymer Prepared as in Example J.1 (a)

In a dry box, 2.4 g of fine $\beta$-SiC powder and 0.6 g (20% by weight) of mixed polymer were combined in a 100 ml round-bottomed flask. The flask was removed from the dry box, charged with 10 ml of toluene, and the ceramic powder was dispersed ultrasonically for one hour. The toluene was removed on a rotary evaporator and the ceramic powder/polymer residue was further dried under vacuum for about 30 minutes. The residue was removed from the flask and lightly ground in a mortar and pestle to produce a fine powder. The powder were loaded into a 3.9 cm×1.3 cm×3.7 cm rectangular steel die and uniaxially pressed at 5000 lbs for 5 minutes. The bar of ceramic powder was then bagged and isostatically pressed at 40,000 psi for one minute. The sample was placed in a quartz tube in a tube furnace and pyrolyzed under nitrogen to 1000° C. heating at 10° C./min. A slightly shrunk ceramic product was formed with a loss of 6% of the original weight.

b. Mixed Polymer Prepared as in Example J.1 (b)

In a dry box, 2.4 g of fine $\beta$-SiC powder and 0.6 g (20% by weight) of mixed polymer were combined in a 100 ml round-bottomed flask. The flask was removed from the dry box, charged with 10 ml of toluene, and the ceramic powder was dispersed ultrasonically for one hour. The toluene was removed on a rotary evaporator leaving a gray residue. The ceramic powder/polymer was further dried under vacuum for about 30 minutes. The residue was removed from the flask and lightly ground with a mortar and pestle to produce a fine powder. The powder were loaded into a 3.9 cm×1.3 cm×3.7 cm rectangular steel die and uniaxially pressed at 5000 lbs for 5 minutes. The bar of ceramic powder was then bagged and isostatically pressed at 40,000 psi for one minute. The sample was placed in a quartz tube in a tube furnace and pyrolyzed under nitrogen to 1000° C., heating at 10° C./min. A slightly shrunk ceramic product was formed with a loss of 6% of the original weight.

This invention has been described in detail with reference to the preferred embodiments thereof. However, it will be appreciated that those skilled in the art, upon consideration of this disclosure, may make modifications and improvements without departing from the spirit and scope of the invention as described in the claims.

We claim:

1. A ceramic material formed by pyrolyzing a physical mixture of polymers of the formulas $[(RSiH)_x(RSi)_y]_n$ and $[(R^1SiHNH)_a(R^1SiN)_b(R^1SiHNE)_c]_m$, where $x+y=1$, n is an integer greater than 1, R is a lower alkyl group having from 1 to about 6 carbon atoms, a lower alkenyl group having 2 to about 6 carbon atoms, a substituted or unsubstituted lower aryl group having from 6 to about 10 carbon atoms; $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 carbon atoms, a tri(lower)alkyl- or di(lower)alkylsilyl group or a di(lower)alkylamino group, n and m are integers greater than 1, and E is a moiety introduced by reaction of an electrophile, E-X, where X is a halogen, sulfate or sulfonate, with $[(R^1SiNH)_a(R^1SiN)_b(R^1SiNM)_c]_m$ where M is an alkali metal or one-half equivalent of an alkaline earth metal.

2. A method for preparing an organosilicon preceramic polymer, wherein the method comprises:
   (a) generating a polysilylamide in the presence of a organopolysilane of the formula: $[(RSiH)_x(RSi)_y]_n$, where $x+y=1$; R is a lower alkyl group having from 1 to about 6 carbon atoms, a lower alkenyl group having from 2 to about 6 carbon atoms, a substituted or unsubstituted lower aryl group having from 6 to about 10 carbon atoms, and n is an integer greater than 1; wherein the polysilylamide is generated by reacting the ammonolysis product of a $R^1SiHX_2$, where $R^1$ is a lower alkyl group having from 1 to about 6 carbon atoms, a substituted or unsubstituted alkenyl group having from 2 to about 6 carbon atoms, a substituted or unsubstituted lower aryl group having from 6 to about 10 crbon atoms, a tri(lower)alkyl or di(lower) alkylsilyl group or a di(lower)alkylamino group and X is a halogen, in solution in the presence of a basic catalyst, wherein the basic catalyst is capable of deprotonating the hydrogen from a nitrogen atom adjacent to a silicon atom, to generate the polysilylamide in situ, referred to as the in situ generated polysilylamide:

(b) allowing the in situ generated polysilylamide and the organopolysilane sufficient time to react with each other at room temperature; and (c) quenching the mixture with an organic halide or halosilane to produce the organosilicon preceramic polymer.

3. The method of claim 2 wherein the mixture of in situ generated polysilylamide and the organopolysilane of step (b) is then heated at reflux.

4. The method of claim 1 wherein the organosilicon preceramic polymer is pyrolyzed in an inert atmosphere for a sufficient time and at a sufficient temperature to form a ceramic product.

5. The method of claim 1 wherein R is the lower alkyl group.

6. The method of claim 5, wherein R is $CH_3$.

7. The method of claim 5 wherein the organosilicon preceramic polymer is pyrolyzed in an inert atmosphere for a sufficient time and at a sufficient temperature to form a ceramic product.

8. The method of claim 6 wherein $R^1SiHX_2$ is $CH_3SiHCl_2$.

9. The method of claim 7 wherein the polymer is pyrolyzed in an inert gas to about 1000° C. to 1300° C.

10. The method of claim 1 wherein the organic halide is a lower alkyl halide.

11. The method of claim 10 wherein the lower alkyl halide is $CH_3I$.

12. A preceramic polymer formed by the method of claim 1.

13. A preceramic polymer formed by the method of claim 10.

14. A preceramic polymer formed by the method of claim 12.

15. The ceramic material of claim 1 wherein E is introduced by an electophile selected from the group consisting of lower alkyl halides and halosilanes.

16. The ceramic material of claim 15 where the electrophile is $CH_3I$.

17. The ceramic polymer of claim 1 where R and $R^1$ are each independently a lower alkyl group.

18. The ceramic polymer of claim 17 where R and $R^1$ are $CH_3$.

* * * * *